United States Patent
Wilson et al.

(10) Patent No.: US 8,238,632 B2
(45) Date of Patent: *Aug. 7, 2012

(54) IMAGING SYSTEM

(76) Inventors: David L. Wilson, Pepper Pike, OH (US); Debashish Roy, Shaker Heights, OH (US); Michael Breen, Apex, NC (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/924,894

(22) Filed: Oct. 7, 2010

(65) Prior Publication Data

US 2011/0091088 A1  Apr. 21, 2011

Related U.S. Application Data

(63) Continuation of application No. 11/581,995, filed on Oct. 17, 2006, now Pat. No. 7,831,075.

(60) Provisional application No. 60/729,004, filed on Oct. 20, 2005.

(51) Int. Cl.
*G06K 9/00* (2006.01)

(52) U.S. Cl. ........................................................ 382/128

(58) Field of Classification Search ........................ None
See application file for complete search history.

(56) References Cited

U.S. PATENT DOCUMENTS

| | | | |
|---|---|---|---|
| 6,173,201 B1 * | 1/2001 | Front | 600/429 |
| 2003/0054342 A1 * | 3/2003 | Star et al. | 435/5 |
| 2003/0187961 A1 * | 10/2003 | Kamata | 709/219 |
| 2004/0026630 A1 * | 2/2004 | Mohun et al. | 250/458.1 |
| 2009/0183613 A1 * | 7/2009 | Lihl et al. | 83/167 |

OTHER PUBLICATIONS

Leica Microsystems et al., Leica CM3600 Cryomacrotome for pharmaceutical and biomedical research, Leica Microsystems, Meyer Instruments, May 2003, http://www.meyerinst.com/html/leica/cm3600/cm3600.htm.*

Weninger et al., "A new episcopic method for rapid 3-D reconstruction: applications in anatomy and embryology", Anatomy Embryology 1998 197: 341-348, Springer-Verlag 1998.*

\* cited by examiner

*Primary Examiner* — Brian P Werner
*Assistant Examiner* — Tahmina Ansari

(57) ABSTRACT

Systems, methods, media, and other embodiments associated with episcopic, histological, autoradiographic, and/or other imaging are described. One exemplary system includes a cryomicrotome, an episcopic imaging device and a histological imaging device, logic for registering episcopic images with histological images, and logic for manipulating images acquired from the episcopic imaging device and the histological imaging device.

13 Claims, 5 Drawing Sheets

US 8,238,632 B2

IMAGING SYSTEM

CROSS REFERENCE TO RELATED APPLICATIONS

This application claims the benefit of U.S. Provisional Application 60/729,004, filed Oct. 20, 2005, titled Three Dimensional Episcopic, Histological, and Autoradiological imaging. This application is a continuation of U.S. application Ser. No. 11/581,995, filed Oct. 17, 2006, which is now U.S. Pat. No. 7,831,075, issued Nov. 9, 2010.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Conventional episcopic imaging may produce two dimensional images. Other conventional and emerging imaging techniques (e.g., histological, autoradiographic, mass spectrometric, Fourier Transform Infrared Spectroscopy (FTIR) may also create two dimensional images. Conventional medical imaging techniques (e.g., PET, SPECT, MRI, CT, OCT) may be limited with regards to resolution and contrast. Rarely, if ever, are the results of these various imaging approaches combined.

DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
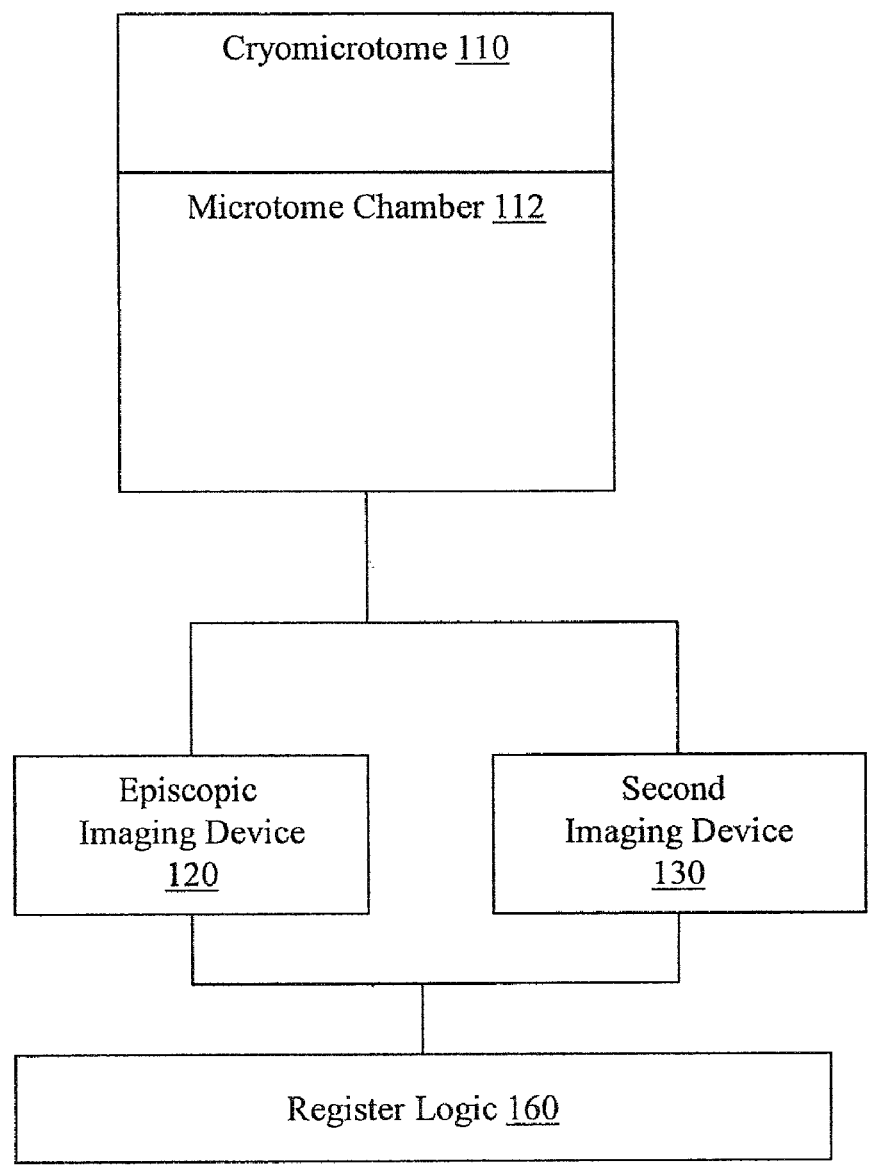
FIG. 1 illustrates an example imaging system.

An example system includes a cryomicrotome having a refrigerated chamber and an episcopic imaging device positioned to image a tissue sample located in the refrigerated chamber. The refrigerated chamber may be, for example, a microtome chamber. The tissue sample may be, for example, a block of frozen tissue. A slice of tissue may be removed from the tissue sample using the microtome. The system may include a histological tape transfer device to transfer the slice of tissue out of the microtome chamber. The slice of tissue may then be transported to, for example, a histological imaging device, and/or an autoradiographic imaging device. These imaging devices may then acquire a histological image and/or an autoradiograph of the tissue slice. Thus, a plurality of different images having a plurality of different image types may be available for a tissue sample and slice. The episcopic image may be acquired while the slice is still attached to the tissue sample, and the histological image and/or autoradiograph may be acquired after the slice is removed. Therefore, the system may include a logic for registering an episcopic image(s) with another image(s) (e.g., histological, autoradiograph). Registering the images may include, for example, positioning and aligning different types of images to create a combined view, a side-by-side view, a three dimensional view, and so on.

Episcopic imaging includes imaging a "block face" of tissue. The block face may be prepared by tissue slicing operations performed by a cryomicrotome. Thus, the system may include acquiring microscopic resolution stacks of episcopic bright field, fluorescence, and/or multi-spectral images from the tissue block face in a cryomicrotome. Taking serial images of the tissue block facilitates creating high-resolution 3D episcopic image volumes. The serial images may be, for example, color and/or fluorescent images. The episcopic imaging device may acquire, for example, high resolution (e.g., micron) images, wide field of view (e.g., six inches) images, large depth of view (e.g., one inch) images, color contrast images, and fluorescent contrast images.

Selected tissue slices can be collected from the cryomicrotome for histological, autoradiographical, mass spectrometry, FTIR, Raman spectroscopy, and/or other processing. These other images (e.g., histological, autoradiographic) may be registered back to episcopic images to create spatially accurate, co-registered, three-dimensional, episcopic, histological, and autoradiographic volumes. Registering an episcopic image and another image (e.g., histological, autoradiographic) involves spatially aligning the images, possibly with warping to correct for deformations. For example, the images may be positioned on top of each other to facilitate viewing an episcopic image overlayed with an autoradiographic image. The registration of histological data facilitates incorporating image morphology of single cells using conventional immunohistochemistry and enzyme histochemistry stains in histology. Tissue sections may be interrogated using fluorescent in situ hybridization (FISH) or laser capture micro-dissection.

Some example systems and methods facilitate collecting episcopic color, episcopic fluorescence, histological, and autoradiographic images, all in an accurate 3D representation. Example systems and methods facilitate obtaining data at the level of the animal (e.g., mouse), organ, tissue structure, cell, membrane receptor, and/or intracellular biochemical and genetic material. Acquiring images throughout a tissue block facilitates creating a high-resolution, episcopic volume. Gross details may be visible in high-resolution color and fluorescent episcopic images. Example systems may operate, for example, on a mouse.

In one example, a cryomicrotome may be sized to facilitate sectioning and imaging a medium sized animal (e.g., rabbit, small primate). In one example, a cryomicrotome like the 8250 Large Section Cryostat provided by The Vibratome Company of St. Louis, Mo. can be modified. The 8250 includes a stage for mounting a frozen tissue block for sectioning, an insulated compartment, a refrigeration unit for holding the tissue block at a suitable temperature (e.g., −20.degree. C.) a programmable temperature feedback controller for maintaining a constant temperature within the insulated compartment, a transparent door, a histology grade knife, a mechanical drive for moving the tissue block against the knife blade so that a section of tissue can be sliced away, and a mechanical mechanism for lifting the frozen tissue block in controllable increments, (e.g., 4 .mu.m to 100 .mu.m) following tissue sectioning operations. Another example cryomicrotome is the Leica CM3050 cryostat, which has elements similar to the 8250, yet which is smaller and thus may be used for smaller samples (e.g., mouse organ). This example includes an encapsulated microtome, motorized sectioning, specimen feed using a stepping motor, programmable defrost cycles, twin compressor cooling, specimen temperature ranging down to −50 C, and section thickness ranging between 0.05 .mu.m and 300 .mu.m.

Modifications to such a conventional cryomicrotome to facilitate episcopic imaging may include first modifications that limit the effect of vibrations from the refrigeration unit that could compromise the episcopic image quality. In one example, imaging is controlled to occur when the refrigeration system is not producing a vibration (e.g., is off, is in a "standby" mode). Refrigeration unit "on time" may be minimized by using a high power refrigeration system, by holding the room at a lower temperature, by covering the cryomicrotome access door during imaging, and so on. Second modifications include computer-based control of automated tissue slicing and imaging. Third modifications include re-engineering a cryomicrotome door to facilitate access to the tissue block face by the imaging system.

In one example, the direction of cryomicrotome stage travel is in the x-direction. Perpendicular to this direction along the tissue stage is the y-direction. The z-direction is down through the tissue sample, as obtained when the cryomicrotome stage is lifted for the next sectioning operation. Enhancements to a conventional cryomicrotome facilitate creating accurate stacks of images along the z-direction. If cryomicrotome section thickness is very accurate, then an example system may count the number of sections to give the cumulative z displacement. If there is variability but not systematic error in slice thickness, the cumulative z-error may be sufficiently small to facilitate acquiring accurate stacks of images. Additionally, and/or alternatively, a displacement encoder may be included to measure cumulative displacement and to record cumulative displacement with tissue slicing.

One example imaging system includes a microscope and camera positioned to create a line of sight to an exposed tissue block. It is to be appreciated that different types of cameras may be employed. One example imaging system is configured to obtain images at a variety of resolutions. The imaging system may include a stereo microscope or high qualify monoscopic zoom microscope with a high quality, optionally cooled, digital camera. Illumination systems facilitate obtaining bright field and/or fluorescence images at single or multiple wavelengths. A series of electronic and/or mechanical filters also facilitate obtaining bright field color images and/or fluorescence images. In one example, using an automated system, focusing and magnification elements may be motorized. These microscope and camera operations may be remotely controlled from a computer and/or may be manually controlled.

Additional enhancements to a conventional cryomicrotome facilitate speeding sample throughput. For example, an operator may move the tissue block to a desired x position to position a region of interest under the imaging system. This x position control may be exercised via manual (e.g., "joystick") control and/or automated control while viewing an image from a microscope. This "imaging location" may then be marked to facilitate subsequent automated control associated with relocating a stage to process this imaging location. Multiple imaging locations may be desirable in some situations. Thus, multiple start and stop positions of the tissue stage may be programmable. The stage speed may be variable so that it can move at a first speed at a first time (e.g., not cutting tissue) and may move at a second speed at a second time (e.g., when sectioning tissue).

In one example of a fully automated system, an additional device and/or logic facilitates removing tissue debris from the block face. Tissue debris may be present following sectioning operations. One example device includes a fan placed inside the insulated chamber. The fan may apply a jet of cold air to the block face at an opportune time to remove debris. Placing this device in the compartment and blowing cold air facilitates maintaining tissue temperature and thus facilitates minimizing refrigeration "on" time, which in turn facilitates minimizing vibration issues. Another example device applies a vacuum to pull debris off the block face. In one example, the device has a small nozzle near the tissue block and applies suction for a short time interval to facilitate not significantly affecting temperature maintenance in the insulated cryomicrotome chamber, which once again facilitates minimizing vibration issues. A vacuum device may return cold air to the chamber if it does not substantially heat the air within the vacuum instrument or vent the air to the outside room. A third example includes a container of compressed gas held within the insulated chamber with a nozzle and solenoid switch. The cold gas can blow debris from the block face. Yet another example includes a soft wide brush placed near the end of the stage stroke to sweep off the block face. It is to be appreciated that other block face debris removal apparatus and/or surface preparation apparatus and techniques may be employed. For example, the block face may be rubbed with a low melting point solution to remove debris and to smooth small crystals. The solution may, for example, be sprayed on the block face (e.g., as a mist) and then wiped with a cloth, rubber blade, or other removal apparatus. In another example, a wiping instrument (e.g., cloth) may be wetted with a solution using, for example, a wicking action.

To obtain micron level resolution images over a large field of view (e.g., six inches) additional automated mechanical positioning capabilities may be employed. In one example, a series of contiguous images may be obtained in the x-y plane and then tiled together to create a larger tiled image. One way to acquire this series of images is to mount the imaging system on an x-y stage and to pan it over the block face under automated control. Another way is to mechanize the tissue stage so that it can make accurate automated displacements in the x direction. By placing the imaging system on a y-stage, it is possible to automatically move the two systems in concert under computer control to obtain effective x-y displacements. Yet another approach uses a high resolution camera (e.g., pixel shifting camera). In this example, the stage may be displaced along the x direction to obtain images along a rectangular field of view. Alternatively, a conventional 2D camera may be replaced with a line scan imager. In this case, lines are scanned and the tissue stage is moved under the imager at a controlled velocity. In one example, configuring optics and using a camera like a pixel-shifting camera(s), a high resolution image with a field of view adequate to image an entire mouse with one exposure may be attained.

One example system and method automate episcopic imaging by including a computer control system. A standard cryomicrotome includes an operator interface panel and electrical controls for controlling the temperature of the unit and the operation of the microtome stage. An electric drive together with operator speed adjustment allows soft starting, continuous speed control, forward slicing operations, and direction reversal. The computer control system may interface with these elements (e.g., electronic drive) to automate control.

A modification may include interfacing to existing electrical control and machine mounted end-limit switches through an external Input/Output (I/O) unit located outside the cryomicrotome. In one example, an Ethernet based remote I/O system (e.g., Wago series 750) with a small form factor design and real-time deterministic I/O update may be employed. In this example, the remote I/O unit will be housed inside the microtome unit and an Ethernet RJ-45 cable will connect the system and the imaging workstation.

A computer may receive slice cut status and/or equipment status feedback (e.g., emergency stop information) through the connection. The computer may also receive The computer may send commands (e.g., cut start, cut stop, stage return, move x, move y, move z, set travel speed) to the system. The computer may therefore control automated sequences of image acquisition events by repeatedly moving the stage, initiating cuts, controlling the camera through an interface to trigger exposure, and acquiring and storing images until the desired number of user-defined cuts (or depth of cut) and images has been achieved.

Tissue slices may be processed on equipment other than the cryomicrotome to obtain other images (e.g., histological, autoradiographical). In one example, a tape transfer system (e.g., from the Vibratome Company (St. Louis, Mo.)) may transfer large tissue sections for histological processing. Histological tissues can be deformed and thus non-rigid registration computer programs may map the histological images to the anatomically correct episcopic volume. Studied samples may yield a high quality episcopic image volume and optional assorted histological images of perhaps different stains referenced to the corresponding episcopic image.

In one example, a compound digital microscope may image histology slides. The compound digital microscope may acquire tiled, large field of view histology images for registering to the episcopic image volume. Similarly, selected tissue slices can be saved for autoradiography. Autoradiography images may be acquired with film and digitized, obtained using a digital image from a storage phosphor plate, and so on. Autoradiography images may include calibration standards for calibrating an image in terms of the concentration of the radiopharmaceutical or its metabolites. Autoradiography images may be registered to corresponding episcopic images to facilitate relating the distribution of radioactivity to anatomy. Doing this with multiple tissue sections facilitates obtaining a 3D autoradiography image volume. Different processing methods may be applied to tissue sections. Examples include, but are not limited to, fluorescent in situ hybridization (FISH), FTIR, mass spectroscopy, Raman spectroscopy, and laser capture micro-dissection.

An example system may provide "off-line" visualization and analysis logic and/or software. The logic and/or software may facilitate measuring lengths, areas, and volumes, registering histological images to an episcopic volume, registering autoradiography images to an episcopic volume, visualizing registered 2D images and image volumes, and so on. Registering histology and episcopic images may include registering a 2D histology image to a corresponding block face image(s). One example registration includes receiving identification of corresponding point landmarks and curve segments, typically portions of the external borders with recognizable "end points." The example may then automatically apply one of various transformations, including a thin plate spline. This interactive approach facilitates correcting highly distorted images, including ones with a "tear."

Mutual information (MI) algorithms provide a robust automatic registration algorithm. Color images can be converted to gray scales and 2D MI registration may be applied. MI can be optimized using a routine like the Simplex algorithm. Rigid body, rigid body with scaling, affine, and thin plate spline image transformations may be supported. An alternative to conventional gray scale cost measure is to compute MI from the color images. In this case, there are 6 joint probability densities (R-R, R-G, R-B, G-G, G-B, and B-B) from which to calculate MI.

With either an interactive or fully automated program, rough, rigid body registration may be applied prior to processing. This may include using ink fiducial points. A pin or other sharp penetrating apparatus dipped in histology ink can be inserted into either frozen or fresh tissue. Resulting pin points can be seen both in cryomicrotome episcopic images and in histology images. Pin points may be uniquely identifiable from surrounding tissue, even without uniquely colored inks.

Visualization and analysis tools aid interpretation of the registered images. For example, it may be useful to display registered images side by side with "linked" cursors that point to the same physical location. Color images may be overlayed with gray-scale medical images, color images may be over-layed with each other, a pixel-by-pixel checkerboard (where pixels come from two different sources) may be made, multiple channels (e.g., alpha channels) that can display a semi-transparent episcopic image on top of a histology image may be used, a low resolution "map" image may be created to show the spatial location of another image at much higher resolution, and so on. Thus, example systems may include a method for interacting with a low resolution tiled episcopic image to locate high resolution episcopic or histology images.

Conventional visualization software allows extraction of color images on a rectangular grid only (e.g., sagittal, coronal, axial views). Multi-planar reformatting of color episcopic images at arbitrary angles may facilitate improving anatomical visualization. For example, multi-planar reformatting may improve identifying muscle orientation in cardiac tissues. Example multiplanar reformatting may interpolate color images using a bicubic interpolation of red, green, and blue channels.

Color episcopic images are rich in anatomical detail. Brightfield color and fluorescent episcopic images contain a rich amount of multi-spectral information. Thus, example systems may include multi-spectral segmentation logic using, for example, classification logic. The multi-spectral segmentation logic may facilitate processing data from, for example, a multi-spectral imaging system.

Episcopic image volumes can be extremely large. Thus, example systems may include solutions for handling voluminous data. Low resolution, mirror volumes may be created. An operator may then interact with the low resolution volume at a first, higher speed. When full resolution is desired, the operator may interact with full resolution images at a second slower speed.

Light can penetrate a tissue block face and thus an episcopic image may include information from subsurface features. This may occur both for bright field, where light will be scattered from subsurface features, and from fluorescent imaging, where fluorescent light will be emitted from subsurface fluorophores. Furthermore, this process may depend upon the scatter and absorption characteristics of tissue within the block face.

Light transmitted through tissue may be attenuated in an exponential manner (e.g., $I = I_0 \exp(-\mu \cdot 2x)$) where $\mu$ is the effective light absorption coefficient, depending upon both scatter and absorption, x is distance, and the factor of 2 is included because light will travel into and out of the tissue. The value of p is unknown, particularly in the case of frozen tissue, and slice thickness can vary from slice to slice and spatially across the slice. The light signal is further modified because light is diffuse reflected and transmitted at the air-tissue and tissue-air interface. As a first approximation, all attenuation may be aggregated into a factor f. In a sequence of episcopic images, the top image $I_i$ will contain subsurface content from the next image $I_{i+1}$ attenuated by f. Image $I_i$ can be corrected by subtracting $I_{i+1}f$ from it. One approach to this problem is to adjust f manually until subsurface structures are removed. For 10 .mu.m sections of mouse brain tissues, a value for f of about 0.5 removed subsurface structures from bright field images. Since tissues have different colors and opacities, .mu., and hence f, should not be constant across a wide field of view image. Thus, f may be a function of different tissues. One possibility is to make .mu. a look up table function of the bright field light intensity. In fluorescent imaging, surface reflection is not a concern, thus simplifying the process.

Example systems and methods facilitate new applications using whole mount staining. Whole mount staining includes staining a large piece of tissue prior to sectioning using color stains and/or fluorescing agents. An example system facilitates combining micron resolution, wide field of view (e.g., whole mouse), depth of view (e.g., whole mouse), and accurate 3D imaging in the whole mount staining environment. Conventionally, stains do not readily enter tissues or cells in whole mount staining. In fact, many are non-lipophilic. With increasing emphasis on in vivo imaging agents, imaging agents are being made to permeate tissues more readily, including the brain, even entering cell interiors. Using these imaging agents, an example system may essentially perform histological staining in a larger sample (e.g., large tissue section, whole mouse) by either injecting the agent in vivo or post mortem. The injecting may include using a high pressure injector post mortem. In this example, histological imaging from the block face image alone may be performed. Additionally, whole mount tissue staining may be applicable in some larger tissue pieces (e.g., tumors) that may be stained all at once, rather than in smaller sections.

Example systems include the ability to acquire fluorescent images. Thus cells tagged with a reporter gene (e.g., gene for green fluorescent protein (GFP)) may be identified. In one example imaging system, single GFP labeled cells in a mouse or other tissue section may be imaged. This facilitates including the ability to image labeled stem cells and labeled tumor cells in a metastatic cancer model. In addition, with genetically modified mice having the GFP gene under control of a specific promoter of interest, it will be possible to three dimensionally image specific cells and tissue structures of interest (e.g., collecting duct principal cells in the kidney of the Hoxb7/GFP transgenic mouse, which very selectively fluoresce).

In one example, a system may be used in concert with a medical imaging device (e.g., MRI, PET, SPECT) and/or an in vivo fluorescence or bioluminescence device. The example may include animal holding logic, software, and/or circuitry to handle small animals, tissues, and images to ensure accurate data registration. With the combinations in the system, it is possible to obtain in vivo images, to identify regions of interest, and then go back and look at these regions at very high resolution using the system. Thus the example system may facilitate obtaining in vivo images of a biological process at limited resolution (e.g., as with in vivo fluorescence), sacrificing an animal, sectioning and imaging the animal, and obtaining histology. The example system may facilitate interrogating a biological process in vivo and extending the interrogation down to the organ scale, the tissue scale, and even the sub-cellular scale.

Successfully registering in vivo and image data from an example system may include performing several techniques. Animals should have a constant posture in the two situations to reduce the need for non-rigid registration. This can be achieved using a restraining device (e.g., plastic tube) during in vivo imaging as well as during freezing in liquid nitrogen. Skin and/or internal fiducials can be added using substances visible in both episcopic images and in vivo images. Multi-modality skin fiducials exist (e.g., ISI Medical Products (Baltimore, Md.)). In the case of an internal fiducial, a device or substance may be inserted internally. One example is metal coated mica particles that can be injected with a syringe and that are visible in MRI and optical images. The particles may be embedded in a substance that hardens in the tissue to maintain droplet position. Computer registration techniques including fiducial and/or gray scale image based methods are employed. The transformation can be rigid or non-rigid. With proper animal/tissue handling, non-rigid registration can be employed.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data that can be read by a computer. A computer-readable medium may take forms, including, but not limited to, non-volatile media (e.g., optical disk, magnetic disk), volatile media (e.g., semiconductor memory, dynamic memory), and transmission media (e.g., coaxial cable, copper wire, fiber optic cable, electromagnetic radiation). Common forms of computer-readable mediums include floppy disks, hard disks, magnetic tapes, CD-ROMs, RAMs, ROMs, carrier waves/pulses, and so on. Signals used to propagate instructions or other software over a network, like the Internet, can be considered a "computer-readable medium."

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between multiple logical and/or physical entities.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, cooperating, and/or parallel processing logics and thus may be loaded and/or executed in serial, parallel, massively parallel and other manners.

Suitable software for implementing various components of example systems and methods described herein may be developed using programming languages and tools (e.g., Java, C, C#, C++, C, SQL, APIs, SDKs, assembler). Software, whether an entire system or a component of a system, may be embodied as an article of manufacture and maintained or provided as part of a computer-readable medium. Software may include signals that transmit program code to a recipient over a network or other communication medium. Thus, in one example, a computer-readable medium may be signals that represent software/firmware as it is downloaded from a server (e.g., web server).

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These algorithmic descriptions and representations are the means used by those skilled in the art to convey the substance of their work to others. An algorithm is here, and generally, conceived to be a sequence of operations that produce a result. The operations may include physical manipulations of physical quantities.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

FIG. 1 illustrates an imaging system that includes a cryomicrotome 110 having a microtome chamber 112 in which a tissue sample may be housed. While a microtome chamber 112 is illustrated, it is to be appreciated that more generally the cryomicrotome may include a refrigerated chamber. Thus, in one example, the microtome chamber 112 may be a refrigerated chamber. The cryomicrotome 110 may be configured to slice a tissue slice from the tissue sample. The imaging system may also include an episcopic imaging device 120. The episcopic imaging device 120 may be configured to acquire an episcopic image of the tissue sample block face in the microtome chamber 112. In one example, the episcopic imaging device 120 may be positioned to look through a transparent portion of the cryomicrotome (e.g., door). The episcopic imaging device 120 may be, for example, a pixel shifting camera, a line scan imager, a multi-spectral imaging device, a two-dimensional camera, and so on. A multi-spectral imaging device may acquire multiple images where the reflected light in the different images has different wavelengths. Thus, the imaging system may acquire microscopic resolution stacks of episcopic bright field, fluorescence, and/or multi-spectral images from the tissue block face in the cryomicrotome 110.

The imaging system may also include a second imaging device 130 to acquire a second image(s) of the tissue sample and/or the tissue slice. While a second imaging device 130 is illustrated, in some examples only a single imaging device will be present. The single imaging device facilitates acquiring microscopic resolution stacks of episcopic bright field, fluorescence, and/or multi-spectral images from the tissue block face in the cryomicrotome 110. The second imaging device 130 may be, for example, a histological imaging device that acquires a histological image(s), an autoradiographic imaging device that acquire(s) an autoradiographic images(s), a mass spectrometry imaging device that acquires a mass spectrometric image(s), an FTIR device that acquires an FTIR image(s), a Raman spectroscopic device that acquires a Raman spectroscopic image, and so on. Since there are at least two imaging devices, there are at least two types of images available.

In some examples, the system may also include a register logic 160 to register two different types of images. For example, the register logic 160 may register an episcopic image. with a histological image. It is to be appreciated that in different examples different combinations of two or more available images having different image types may be registered together. For example, the register logic 160 may be configured to register an episcopic image with a histological image, an autoradiographic image, a mass spectrometric image, a Raman spectroscopic image, and/or an FTIR image.

Figure 2:
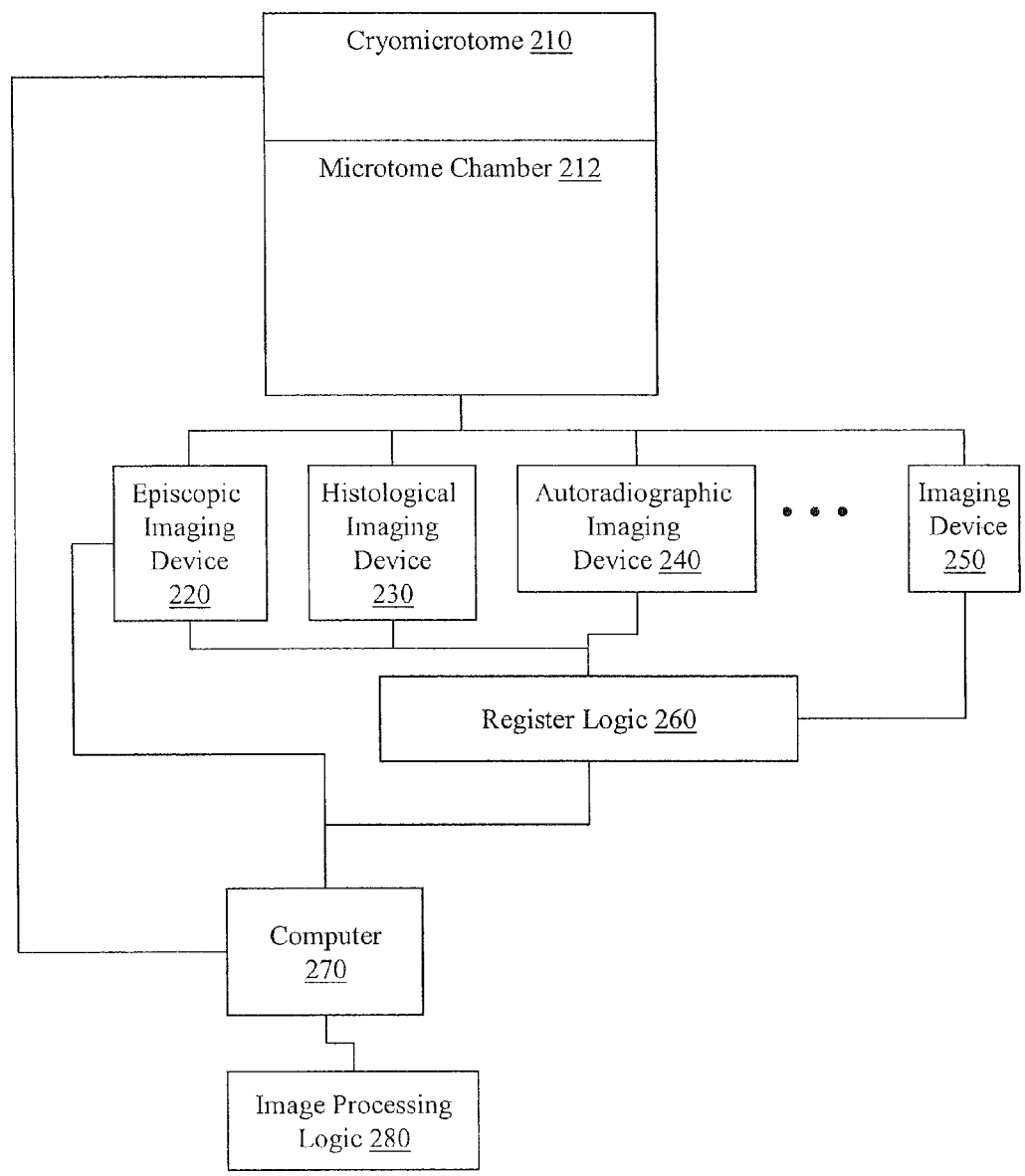
FIG. 2 illustrates an example imaging system.

FIG. 2 illustrates an imaging system. This imaging system has elements similar to those described in connection with FIG. 1. For example the system includes a cryomicrotome 210 having a microtome chamber 212. The system also includes an episcopic imaging device 220 and a register logic 260. Additionally, the system includes other imaging devices including a histological imaging device 230, an autoradiographic imaging device 240, and other imaging devices (e.g., imaging device 250).

The system also includes a computer 270. Computer 270 can be used, for example, to view an episcopic image, a histological image, an autoradiographic image, a mass spectrometric image, an FTIR image, and/or registered images. The computer 270 may also store these types of images. While a single computer 270 is illustrated, it is to be appreciated that in one example, processing performed by computer 270 may be distributed between different computers.

Figure 4:
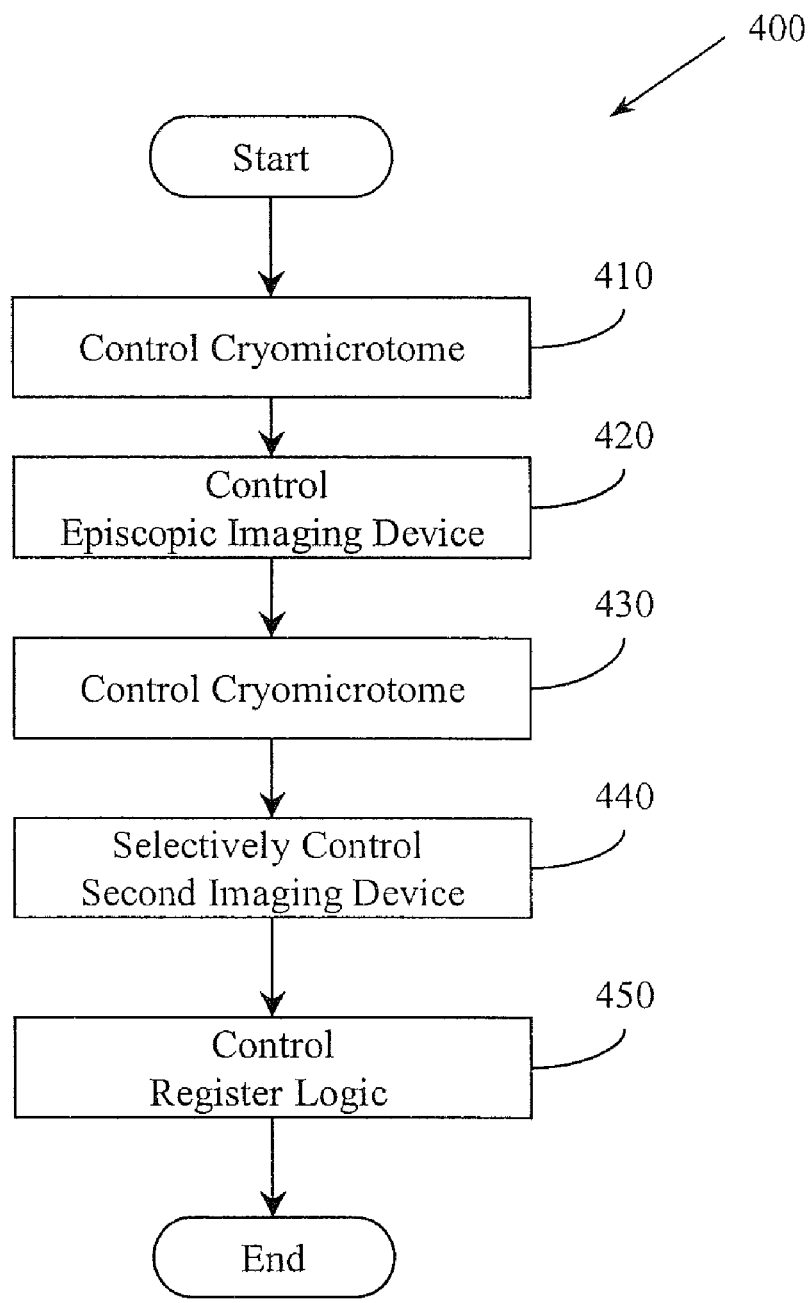
FIG. 4 illustrates an example imaging method.
Figure 5:
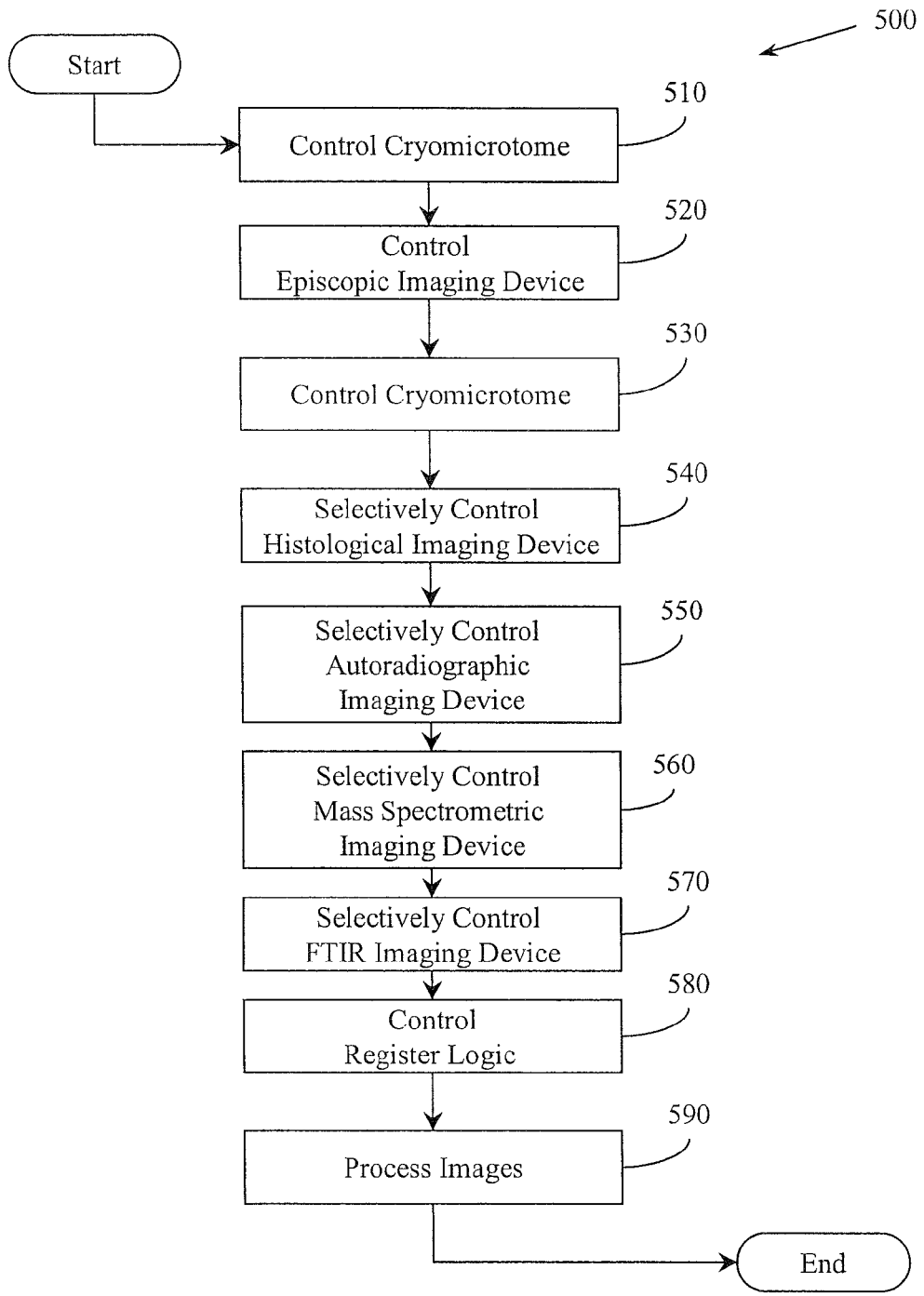
FIG. 5 illustrates an example imaging method.

In addition to viewing and/or storing images, computer 270 can facilitate performing automated control of other elements. For example, computer 270 may be configured to perform: episcopic imaging device 220 control, histological imaging device 230 control, autoradiographic imaging device 240 control, mass spectrometry imaging device control, FTIR imaging device control, image storage, and/or automated cryomicrotome 210 control. Thus, actions that may previously have been performed manually may now be performed under automated control. The methods described in connection with FIGS. 4 and 5 illustrate at least portions of this type of automated control. The automated control of the cryomicrotome 210 may include, for example, controlling a cut start, controlling a cut end, controlling an image start, controlling an image end, controlling a stage position, controlling a stage move speed, establishing one or more points of interest, establishing a start position, and establishing a stop position. This control may be exercised, for example, by sending commands, signals, and/or other control data from computer 270 to cryomicrotome 210 and/or other elements.

The system may also include an image processing logic 280. The image processing logic 280 may operate on the images available to computer 270. The operations may include processing (e.g., reformatting) an image by multi-planar reformatting, sub-sampling of a volume, color image segmentation, registered image visualization, sub-surface structure removal, and so on. Sub-surface structure removal may include, for example, calculating a light attenuation factor and subtracting a first episcopic image from a second episcopic image, where the subtraction is controlled, at least in part, by the light attenuation factor.

The system may be controllable to collect sets and/or series of images. For example, the system may be controllable to collect a series of contiguous images and to control the image processing logic 280 to tile together the series of contiguous images into a single image. Additionally, and/or alternatively, the system may be controllable to collect a series of images and to control the image processing logic 280 to process the series into a three-dimensional representation.

Figure 3:
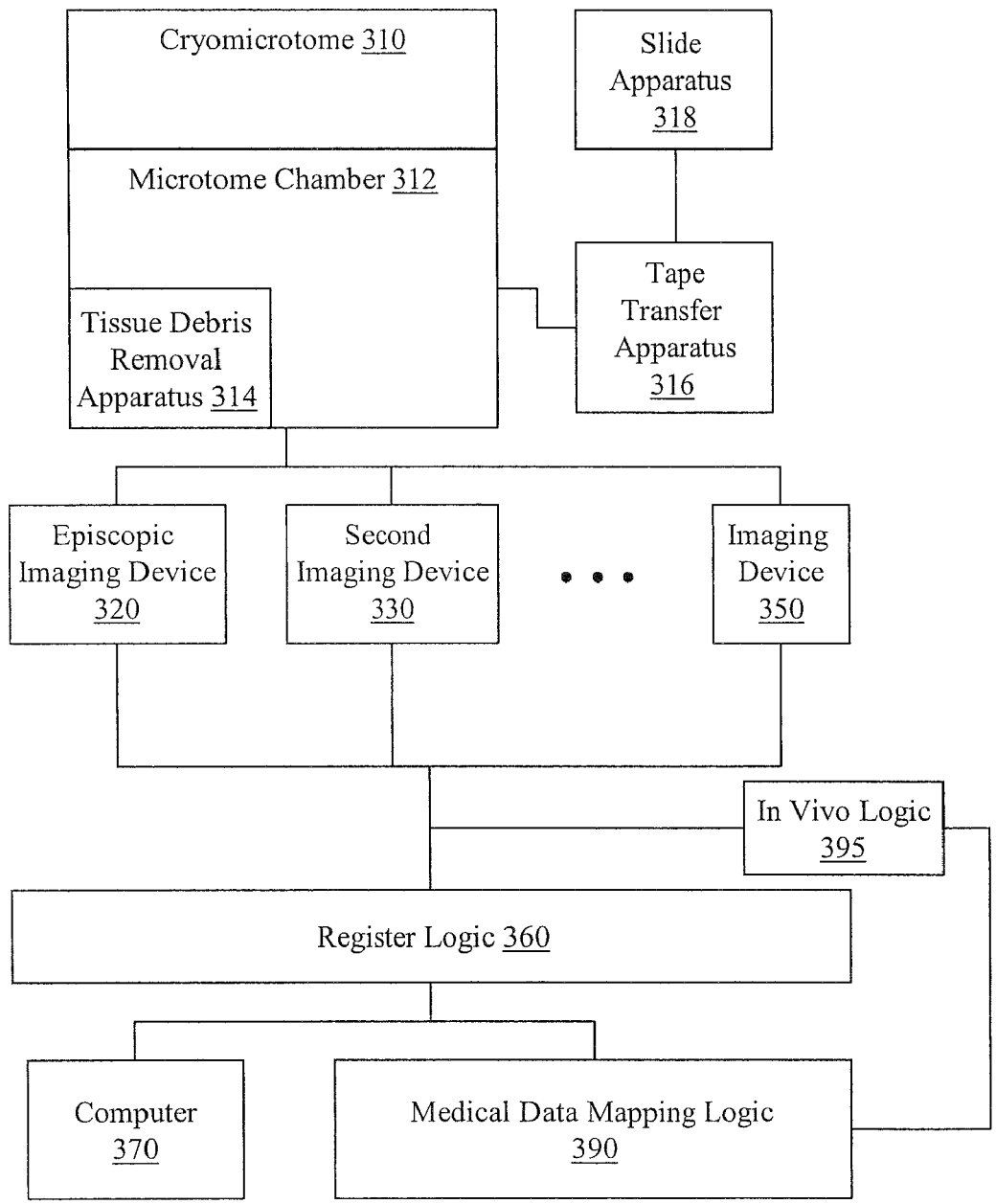
FIG. 3 illustrates an example imaging system.

FIG. 3 illustrates a system that includes several elements similar to those described in connection with FIG. 2. For example the system in FIG. 3 includes a cryomicrotome 310 having a microtome chamber 312. The system also includes an episcopic imaging device 320 and other imaging devices (e.g., second imaging device 330 through imaging device 350). The system also includes a register logic 360 and a computer 370.

The system also includes other additional elements. For example, the system includes an in vivo logic 395 configured to interface the system with devices including, for example, a medical imaging device, an in vivo fluorescence device, and an in vivo bioluminescence device. The medical imaging device may be, for example, a magnetic resonance imaging (MRI) device, a positron emission tomography (PET) device, an in vivo fluorescence device, an in vivo bioluminescence device, a computed tomography (CT) device, an ultrasound device, an optical coherence tomography (OCT) device, and a single photon emission computed tomography (SPECT) device. Data may be provided from these systems through, for example, a medical data mapping logic 390. While these devices are described as being in vivo devices, it is to be appreciated that they may also be used to image non-living specimens.

With this type of medical imaging data available, the system may be controllable through register logic 360 to register medical imaging data to episcopic imaging data, histological data, autoradiographic data, in vivo fluorescence data, in vivo bioluminescence data, CT data, ultrasound data, OCT data, SPECT data, and so on.

In one example the system may include a tape transfer apparatus 316. Apparatus 316 may facilitate removing a tissue slice from the microtome chamber 312 and making the tissue slice available to other devices (e.g., second imaging device 330). In one example, the tape transfer apparatus 316 may be a histological tape transfer device that can remove a tissue slice from the microtome chamber 312. In one example, the tape transfer apparatus 316 may facilitate preparing slides. Thus, the system may include a slide apparatus 318. This slide apparatus 318 may facilitate storing slides and/or recalling slides that may be correlated to registered images. Thus, when an interesting image is viewed, it may be possible to automatically retrieve a relevant slide. The retrieval may be performed robotically under computer control.

The cryomicrotome 310 may also include, for example, a refrigeration unit (not illustrated). The refrigeration unit may be controllable to not operate while an episcopic image is being acquired. For example, computer 370 may provide commands, signals, and/or other control data to cryomicrotome 310 and/or episcopic imaging device 320 to coordinate imaging with times when vibrations are lessened due to the refrigeration unit being active.

The cryomicrotome 310 may also include a tissue debris removal apparatus 314, which may, additionally and/or alternatively perform surface preparation. The tissue debris removal apparatus 314 may be, for example, a brush, a gas blowing system, a vacuum system, and so on. The surface preparation may include, for example, wiping the tissue surface with a low melting point solution.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

It will be appreciated that electronic and software applications may involve dynamic and flexible processes and thus that illustrated blocks can be performed in other sequences different than the one shown and/or blocks may be combined or separated into multiple components. In some examples, blocks may be performed concurrently, substantially in parallel, and/or at substantially different points in time.

FIG. 4 illustrates a method 400. Method 400 may include, at 410, controlling a cryomicrotome to position a tissue sample in a refrigerated chamber in the cryomicrotome. Controlling the cryomicrotome may include, for example, issuing a start cut command, a stop cut command, a start image command, an end image command, an x coordinate positioning command, a y coordinate positioning command, a z coordinate positioning command, an (x,y) positioning command, an (x,y,z) positioning command, a stage travel speed command, a start position command, a stop position command, and so on. While issuing Method 400 may also include, at 420, controlling an episcopic imaging device to acquire an episcopic image of the tissue sample. Controlling the episcopic imaging device may include, for example, controlling an episcopic imaging device focus setting, controlling an episcopic imaging device magnification setting, and so on. Controlling the episcopic imaging device may result in the acquisition of microscopic resolution stacks of episcopic bright field, fluorescence, and/or multi-spectral images from the tissue block face. In one example, method 400 may terminate after 420.

In another example, method 400 may also include, at 430, controlling the cryomicrotome to acquire a tissue slice from the tissue sample. Controlling the cryomicrotome in this fashion may include specifying a start position, a stop position, a slice thickness, and so on.

Method 400 may also include, at 440, selectively controlling a second imaging device to acquire second images of the tissue sample and/or the tissue slice. The second imaging device may be, for example, a histological imaging device, an autoradiographic imaging device, an FTIR device, an ultrasound device, a CT device, an OCT device, and so on.

Method 400 may also include, at 450, controlling a register logic to register the episcopic image and a second image(s). For example, the register logic may be controlled to register an episcopic image with a histological image and/or an autoradiographic image. While these three types of images are described, it is to be appreciated that the register logic may also be controlled to register other types and combinations of images.

Additionally, the register logic may be controlled at 450 to register episcopic images, histological images, and so on with medical imaging data. For example, the control at 450 may include controlling the register logic to selectively register the episcopic image and/or a second image with medical imaging data acquired from an MRI device, a PET device, an in vivo fluorescence device, an in vivo bioluminescence device, a CT device, an ultrasound device, an OCT device, a SPECT device, and so on.

FIG. 5 illustrates a method 500 that includes some elements similar to those described in connection with method 400 (FIG. 4). For example, method 500 includes controlling 510 a cryomicrotome, controlling 520 an episcopic imaging device, controlling 530 the cryomicrotome, and controlling 580 a register logic. Where method 400 included selectively controlling 440 a second imaging device, method 500 describes selectively controlling specific devices.

For example, method 500 includes, at 540, selectively controlling a histological imaging device. Method 500 also includes, at 550, selectively controlling an autoradiographic imaging device. Method 500 also includes, at 560, selectively controlling a mass spectrometric imaging device. Method 500 also includes, at 570, selectively controlling an FTIR imaging device. While selectively controlling these four types of second imaging devices is described, it is to be appreciated that method 500 may include selectively controlling different sets of these or other second imaging devices. The selective control may include, for example, determining which type of imaging devices are available, examining configuration parameters, and so on.

Method 500 also includes, at 590, processing images. The images may be, for example, the episcopic image and/or the second images. The processing may include, for example, multi-planar reformatting, sub-sampling of large volumes, color image segmentation, visualizing registered images, sub-surface structure removal, and so on.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methods for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An imaging system, comprising:
   a cryomicrotome having a microtome chamber configured to house a sample, the cryomicrotome being configured to produce a slice from the sample;
   an episcopic imaging device configured to acquire an episcopic image of the sample while it is housed in the microtome chamber;
   a second imaging device configured to acquire a second non-episcopic image of one or more of, the sample, and the slice;
   and
   a register logic configured to register the episcopic image with the second non-episcopic image, the second imaging device being one of, a histological imaging device configured to acquire a histological image, an autoradiographic imaging device configured to acquire an autoradiographic image, a mass spectrometry imaging device configured to acquire a mass spectrometric image, a Raman spectroscopy device configured to acquire a Raman spectroscopic image, and a Fourier transform infrared spectroscopy (FTIR) device configured to acquire an FTIR image.

2. The system of claim 1, including an in vivo logic configured to interface the system with one or more of, a medical imaging device, an in vivo fluorescence device, and an in vivo bioluminescence device, the medical imaging device being one of, a magnetic resonance imaging (MRI) device, a positron emission tomography (PET) device, an in vivo fluorescence device, an in vivo bioluminescence device, a computed tomography (CT) device, an ultrasound device, an optical coherence tomography (OCT) device, and a single photon emission computed tomography (SPECT) device,
   the system being controllable to register medical imaging data from the medical imaging device to one or more of, episcopic imaging data from the episcopic imaging device, histological data, autoradiographic data, in vivo fluorescence data, in vivo bioluminescence data, CT data, ultrasound data, OCT data, and SPECT data.

3. A computer-based imaging method, comprising:
   controlling a cryomicrotome to position a sample in a chamber in the cryomicrotome;
   controlling an episcopic imaging device to acquire an episcopic image of the sample;
   controlling the cryomicrotome to slice a slice from the sample;
   selectively controlling a second imaging device to acquire one or more second non-episcopic images of one or more of, the sample, and the slice; and
   controlling a register logic to register the episcopic image and one or more of the second non-episcopic images;
   where the second imaging device is one of, a histological imaging device, an autoradiographic imaging device, a Fourier transform infrared spectroscopy (FTIR) device, an ultrasound device, a computed tomography (CT) device, and an optical coherence tomography (OCT) device.

4. The method of claim 3, including selectively registering one or more of, the episcopic image, and a second non-episcopic image with a medical imaging data acquired from one or more of, a magnetic resonance imaging (MRI) device, a positron emission tomography (PET) device, an in vivo fluorescence device, an in vivo bioluminescence device, a computed tomography (CT) device, an ultrasound device, an optical coherence tomography (OCT) device, and a single photon emission computed tomography (SPECT) device.

5. An imaging system, comprising:
   a sectioning apparatus configured to house a sectionable sample, to section the sectionable sample, and to acquire a section from the sectionable sample;
   an episcopic imaging device configured to acquire an episcopic image of the sectionable sample while the sectionable sample is housed in the sectioning apparatus;
   a second imaging device configured to acquire a second non-episcopic image of one or more of, the section, and the sectionable sample; and
   a register logic configured to produce a registered image by registering the episcopic image and the second image.

6. The imaging system of claim 5, where the sectionable sample is one of, a human tissue, a non-human animal tissue, and a vegetable tissue.

7. A non-transitory computer-readable medium storing computer executable instructions that when executed by a computer-based imaging system control the computer-based imaging system to perform a method, the method comprising:
   controlling a sectioning apparatus to position a sectionable sample in a temperature controlled portion of the sectioning apparatus;
   controlling an episcopic imaging device to acquire an image of the sectionable sample;
   controlling the sectioning apparatus to slice a section from the sectionable sample;
   controlling a second imaging device to acquire one or more second non-episcopic images of one or more of, the sectionable sample, and the section; and
   controlling a registration logic to produce a registered image comprising the registration of the episcopic image and the second non-episcopic image.

8. The non-transitory computer-readable medium of claim 7, the sectionable sample being one of, a human tissue, a non-human animal tissue, a vegetable tissue, and not a tissue.

9. The non-transitory computer-readable medium of claim 7, the method comprising controlling the temperature of the sectionable sample to within a desired tolerance.

10. The non-transitory computer-readable medium of claim 9, where controlling the temperature of the sectionable sample comprises bringing a temperature controlled gas in contact with the sectionable sample.

11. The non-transitory computer-readable medium of claim 7, the second imaging device being one of, a histological imaging device, an ultrasound device, a computed tomography (CT) device, an optical coherence tomography (OCT) device, an autoradiographic imaging device, a mass spectrometry imaging device, a Raman spectroscopy device, a Fourier transform infrared spectroscopy (FTIR) device, a magnetic resonance imaging (MRI) device, a positron emission tomography (PET) device, and a single photon emission computed tomography (SPECT) device.

12. The non-transitory computer-readable medium of claim 7, the method comprising:
   controlling the episcopic imaging device and the second non-episcopic imaging device to collect a series of contiguous images;
   selectively tiling together the series of contiguous images into a single image, and
   processing the series into a three-dimensional representation.

13. The non-transitory computer-readable medium of claim 7, the method comprising:
performing one or more of:
multi-planar reformatting of the registered image,
sub-sampling of a volume of the registered image,
color image segmentation of the registered image,
visualization of the registered image, and
sub-surface structure removal from the registered image.

* * * * *

UNITED STATES PATENT AND TRADEMARK OFFICE
CERTIFICATE OF CORRECTION

Page 1 of 1

PATENT NO. : 8,238,632 B2
APPLICATION NO. : 12/924894
DATED : August 7, 2012
INVENTOR(S) : Wilson et al.

It is certified that error appears in the above-identified patent and that said Letters Patent is hereby corrected as shown below:

In the Specifications:

In column 3, line 10, delete "0.05.mu.m and 300.mu.m." and replace with --0.05µm and 3000.05µm.--.

In column 5, line 15, delete "The computer may also receive".

In column 6, line 66, delete "(e.g. I=I.sub.0exp(-.mu.2x)) where .mu." and replace with --(e.g. $I = I_0\exp(-\mu 2x)$) where µ--.

In column 7, line 13, delete "10.mu.m" and replace with --10µm--.

Signed and Sealed this
Second Day of July, 2013

Teresa Stanek Rea
*Acting Director of the United States Patent and Trademark Office*